(12) United States Patent
Zimmer

(10) Patent No.: US 6,511,254 B1
(45) Date of Patent: Jan. 28, 2003

(54) JOINT

(75) Inventor: Joachim Zimmer, Sasbach (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,100

(22) PCT Filed: Aug. 19, 1998

(86) PCT No.: PCT/DE98/02417

§ 371 (c)(1),
(2), (4) Date: Apr. 23, 1999

(87) PCT Pub. No.: WO99/10210

PCT Pub. Date: Mar. 4, 1999

(30) Foreign Application Priority Data

Aug. 26, 1997 (DE) ......................................... 197 37 070

(51) Int. Cl.$^7$ ................................................. B25G 3/02
(52) U.S. Cl. .................... 403/365; 403/345; 15/205.31; 15/250.351
(58) Field of Search ................. 403/353, 279, 403/345, 282, 365, 274, 367, 368; 15/250.21, 250.3, 250.31, 250.351, 250.352

(56) References Cited

U.S. PATENT DOCUMENTS

| 2,229,720 | A | * | 1/1941 | Bramming | 15/250.351 |
|---|---|---|---|---|---|
| 2,254,343 | A | * | 9/1941 | Zierer | 15/250.23 |
| 2,295,621 | A | * | 9/1942 | Zaiger | 15/250.351 |
| 2,528,283 | A | * | 10/1950 | Nesson | 15/250.351 |
| 2,820,238 | A | * | 1/1958 | Roth et al. | 15/250.23 |
| 3,813,726 | A | * | 6/1974 | Kowalewski | 15/385 |
| 3,829,924 | A | * | 8/1974 | Dittrich et al. | 15/250.14 |
| 4,512,056 | A | | 4/1985 | Wattier | |
| 4,559,663 | A | * | 12/1985 | Bauer et al. | 15/250.35 |
| 4,672,709 | A | | 6/1987 | Licata et al. | |
| 4,683,605 | A | * | 8/1987 | Leroy et al. | 15/250.21 |
| 4,776,057 | A | * | 10/1988 | Beneteau et al. | 15/250.21 |
| 4,840,075 | A | * | 6/1989 | Tucker | 74/89.14 |
| 4,947,508 | A | * | 8/1990 | Bauer et al. | 15/250.35 |
| 5,319,851 | A | * | 6/1994 | Ikezawa et al. | 29/898.055 |
| 5,398,370 | A | * | 3/1995 | Gorner et al. | 15/250.35 |
| 5,481,778 | A | * | 1/1996 | Battlogg | 15/250.202 |
| 5,553,962 | A | * | 9/1996 | Eustache | 15/250.32 |
| 5,606,764 | A | * | 3/1997 | Zhou et al. | 15/250.16 |
| 5,613,267 | A | * | 3/1997 | Battlogg | 15/250.202 |
| 5,651,159 | A | * | 7/1997 | Hoshino | 15/250.201 |
| 5,685,659 | A | * | 11/1997 | Brosius et al. | 403/65 |
| 5,890,256 | A | * | 4/1999 | Eustache | 15/250.21 |
| 6,021,539 | A | * | 2/2000 | Zhadanov et al. | 15/29 |
| 6,249,929 | B1 | * | 6/2001 | Metz | 15/250.352 |

FOREIGN PATENT DOCUMENTS

| DE | 197 37 070 A1 | | 3/1999 | |
| GB | 2 317 818 A | | 4/1996 | |
| GB | 2 317 818 | * | 4/1998 | ............ B60S/1/34 |
| GB | 2317818 A | * | 4/1998 | |

* cited by examiner

Primary Examiner—Lynne H. Browne
Assistant Examiner—Michael P Ferguson
(74) Attorney, Agent, or Firm—Michael J. Striker

(57) ABSTRACT

The invention is based on a link joint with a first lever (10) which is constructed as a bent sheet metal part and which has, at one end, a trough (24) for receiving a bearing pin (14) and with a second lever (12) having a bearing eye (15) which encloses the bearing pin (14) and which has a bearing part (16) that is held between two stop surfaces (18, 20) arranged at its front sides. It is proposed that the bearing pin (14) has a hollow space (22) which is open at least toward a front side.

18 Claims, 4 Drawing Sheets

JOINT

BACKGROUND OF THE INVENTION

The invention is based on an articulation connection or link joint.

Link joints are frequently used in lever linkages, including wiper drives, especially in so-called four-bar linkage wiper drive installations. In this respect, a first lever, e.g., a fastening part, is usually constructed as a bent sheet metal part having, at the end on the joint side, a trough whose edge is bent outward at the free sides in the direction of the bottom of the trough in the shape of an apron or skirt and projects over the base of the trough. A bearing pin is riveted in the center of the trough accompanied by an outer washer, wherein a rivet part is formed integral with the bearing pin and the rivet head is covered by a protective cap which is fastened to the washer. The bearing pin is enclosed by a bearing eye of a second lever, e.g., a coupling lever, in which a bearing part of plastic is injected. The second lever is held axially between a bearing disk in the trough of the first lever and a collar of the bearing journal. The bearing between the bearing pin and the bearing part is sealed outwardly. The second lever carries an outer covering in the area of the bearing eye.

The wiper drives which are arranged in the area between a vehicle windshield and a part of the body, particularly an engine hood, substantially determine with their link joints the distance between the body part and the windshield, wherein this distance should be kept as short as possible for visual and acoustic reasons as well as for reasons of flow.

SUMMARY OF THE INVENTION

According to the invention, the bearing pin has a hollow space which is open at least toward one front side. This saves on material and weight on the one hand and, on the other hand, numerous possibilities are opened for constructing the link joint in a simpler and especially in a flatter manner in that the hollow space is utilized for the connection between the bearing pin and the first lever.

According to a construction of the invention, the trough has, in the center, a deep-drawn or cupped hollow body which projects into the hollow space of the bearing pin and is riveted at its front side with the bearing pin. The hollow body which is formed integral with the first lever can serve to fasten the bearing journal in the manner of a hollow rivet, but can also form the bearing journal by itself. In both cases, with the length of the bearing surface remaining the same, the link joint is flatter because, in the first case, the connection point between the first lever and the bearing pin lies within the joint and therefore does not take up any axial construction space and, in the second case, a connection point is omitted. An outer washer and protective cap can be dispensed with. This facilitates manufacture and assembly and reduces weight and use of material. Further, the connection point is located in an area with low mechanical loading with respect to bending moments.

Since the bottom of the trough forms the lower limit of the first lever, the skirt-shaped part of the trough edge which previously concealed the washer and protective cap can also be dispensed with. The trough edge advisably runs in a quarter circle transverse to a swivel axis and terminates radially with a joint cover at the second lever. The diameter of the bearing eye with its covering accordingly determines the greatest width of the lever which is reduced compared with conventional link joints.

The hollow body can be open or closed. When closed, it is no longer necessary to seal relative to the joint space. The hollow body can only project slightly into the hollow space of the bearing pin and can rest against a corresponding narrowed portion of the hollow space by its riveted head. In another construction, the hollow body is guided through the hollow space and is riveted at its free end with a collarless bearing journal via a bearing disk. In this case, the bearing journal is formed of a cylindrical spacer sleeve which is held between the two bearing disks. The hollow body is connected with the outer bearing disk in that its outer edge is beaded and the bearing disk presses against the end face of the spacer sleeve or its base is connected with the bearing disk by a separate rivet. According to another construction of the invention, the hollow body forms a collar at the front side for contact by the bearing disk, wherein the bearing disk is riveted against this collar with the outer part of the hollow body.

The height of the link joint can be further reduced through the use of a high-quality bearing bush, e.g., formed of plastic-coated steel, which is connected with the bearing pin or the bearing part. The length of the bearing surface and friction are reduced by the increased loading capacity and wear behavior is also improved.

When the hollow body itself serves as a bearing journal, a bearing material is preferably sprayed or injection-molded onto its outer circumference. The layer of bearing material extends up to the trough base. In this construction, the hollow body carries the second bearing disk at a collar, against which it is riveted with the edge of the hollow body.

The link joint can be constructed in a more economical manner even when the second lever is formed by a bent sheet metal part which has a substantially U-shaped cross section and has everted portions facing inward in the area of the link joint, wherein the bearing part is injection-molded on the everted portions on both sides. Owing to the injection on both sides, the everted portions do not deform during the injection process and the bearing surfaces can be produced within the desired tolerances. In order to promote the injection process, it is further advisable to more or less fill up the intermediate space between the everted portion and the U-shaped profile.

The U-shaped profile is lined with a plastic covering. When the covering closes the open side of the U-shaped profile, a lever is formed which is closed on all sides. The advantages of the second lever as a bent sheet metal part are so great that it appears worthwhile to utilize it not only in combination with a link joint according to the invention, but also with a link joint according to the preamble of claim 1.

BRIEF DESCRIPTION OF THE DRAWINGS

Further advantages are indicated in the following description of the drawings. The drawings show embodiment examples of the invention. The drawings, the description and the claims contain numerous features in combination. The person skilled in the art will also advisably consider the features individually and combine them to form other useful combinations.

DESCRIPTION OF THE PREFERRED EMBODIMENTS

Figure 1:
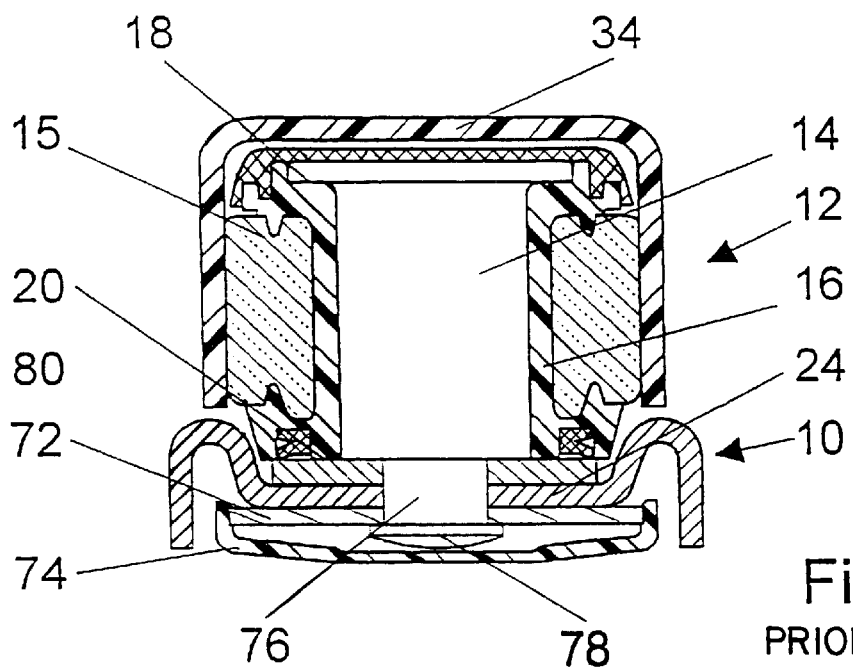
FIG. 1 shows a section through a link joint according to the prior art.
Figure 2:
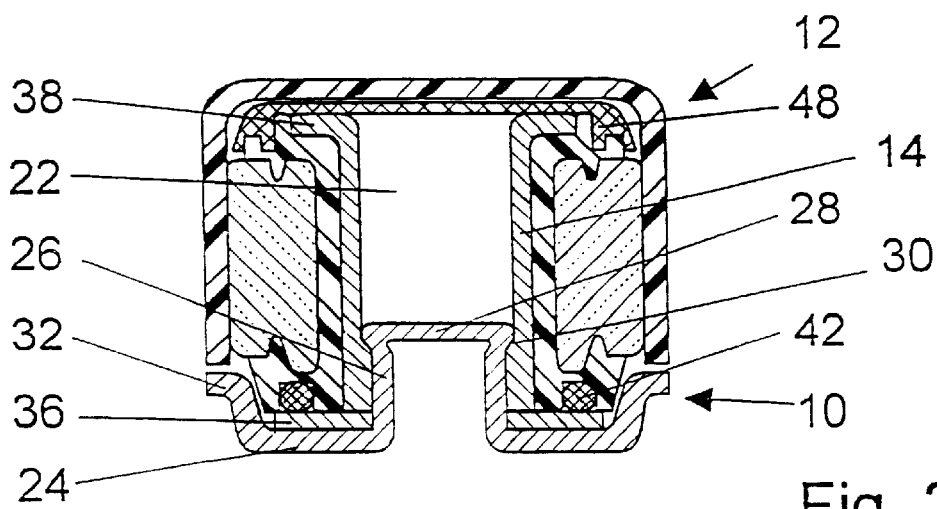
FIG. 2 shows a section through a link joint according to the invention.

Conventional link joints have a first lever 10 which is constructed as a bent sheet metal part, wherein a trough 24 is formed integral therewith at one end on the joint side. A bearing pin 14 is arranged in the center of the trough 24, wherein the bearing pin 14 is inserted through a bearing disk 80, the base of the trough 24 and a washer 72 and riveted with a rivet part 76. A protective cap 74 which is fastened to the washer 72 covers the rivet head 78. The edge of the trough 24 is bent outward and extends over the region of the protective cap 74 in a skirt-shaped manner.

A second lever 12 comprises the bearing pin 14 with a bearing eye 15 in which a bearing part 16 conventionally made from plastic is injection molded. As a rule, it is produced as a die-cast part. The bearing part 16 runs on the bearing pin 14 and is supported axially at the bearing disk 80 and at a collar 82 of the bearing pin 14. The bearing formed in this way is protected by a sealing cap 48 on the one hand and, on the other hand, by an axial seal in the form of a lip seal 40 or profile ring 42, 44 between the bearing disk 80, 36 and the bearing part 16. A joint cover 34 fastened to the second lever 12 lines the joint area.

In the constructions according to the invention according to FIGS. 2 and 3, 6 to 9, and 11, the bearing pin 14 has a hollow space 22, so that the connection between the first lever 10 and the bearing pin 14 can be situated in the bearing area and therefore does not take up any axial construction space. For this purpose, the hollow space 22 according to the construction shown in FIG. 2 forms a narrowed area toward the trough, so that the upset end of the hollow body 26 contacts a contact face 30 in the area of its front side 28. The deep-drawn hollow body 26 is closed at its front side 28 and tightly closes the bearing at the connection point. Accordingly, the protective cap 74 and the washer 72 can be dispensed with so as to save on structural component parts and reduce the axial structural length. Further, a sealing cap 48 and a profile ring 42 in the form of a round rubber ring are provided which seal the bearing region at the front sides of the bearing part 16.

Since the trough 24 is closed at the bottom and the base of the trough 24 forms the lower boundary of the first lever 10, its apron-shaped edge can be omitted and the edge 32 can terminate in a quarter circle and close radially at the joint cover 34. This results in a narrow first lever 10 whose width is substantially determined by the bearing eye 15 and the joint cover 34. Due to these steps, the link joint is flatter and narrower given the same bearing surface.

Figure 3:
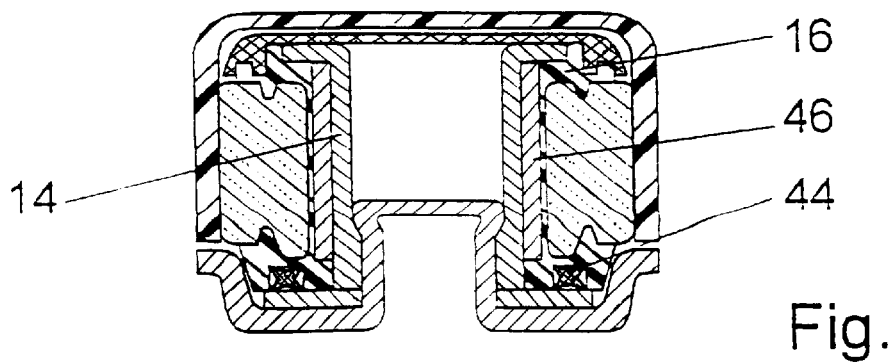
FIG. 3 shows a variant of FIG. 2 with a bearing bush.
Figure 4:
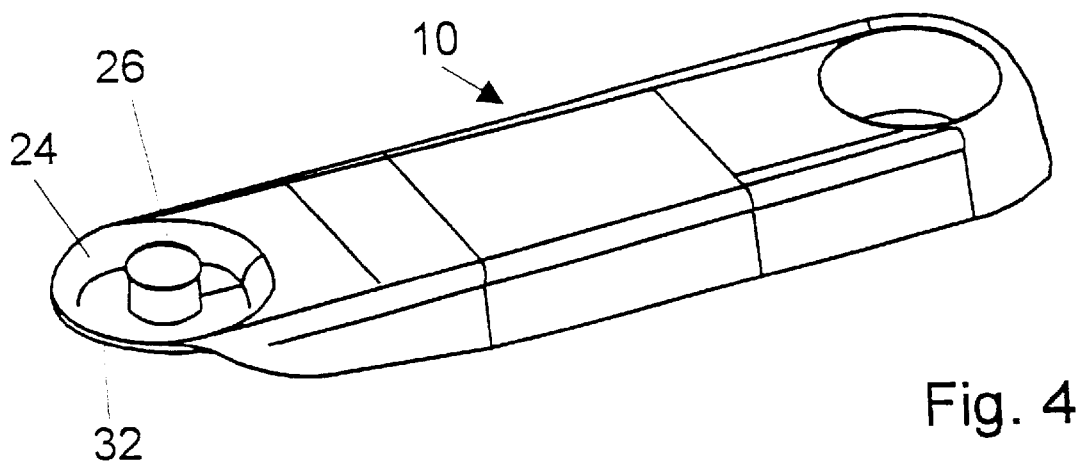
FIG. 4 shows a perspective view of a first lever according to a link joint according to the invention.
Figure 5:
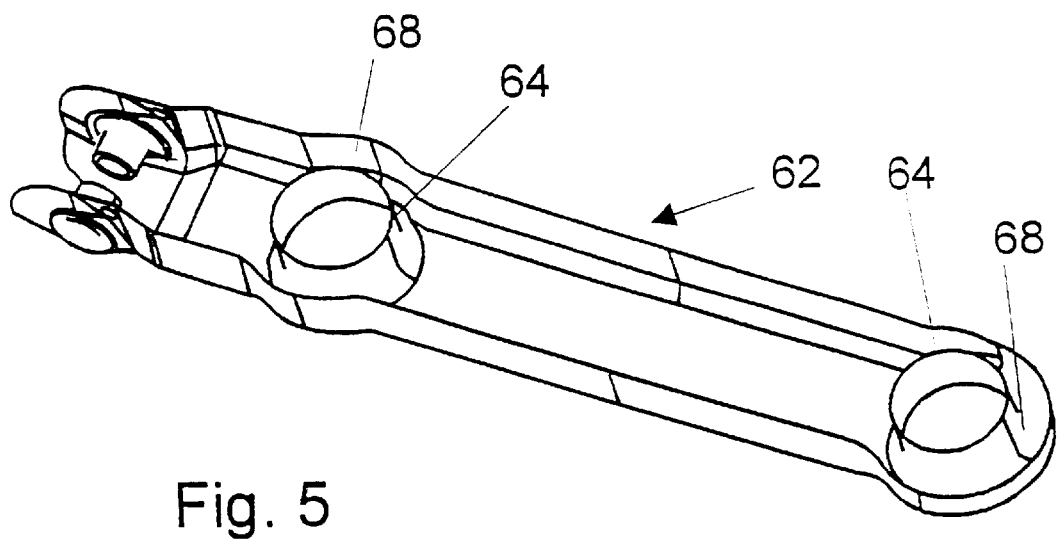
FIG. 5 shows a perspective view of a second lever as a bent sheet metal part.
Figure 6:
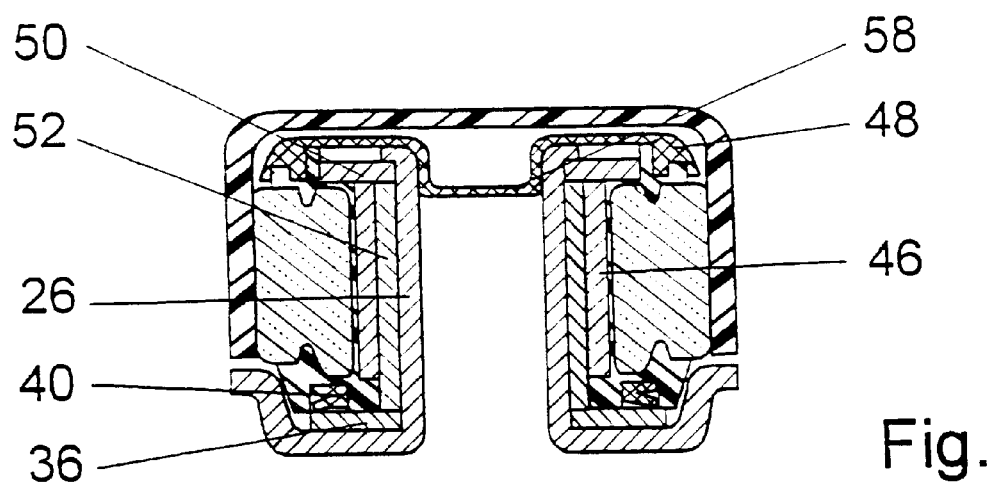
FIGS. 6 to 9 show variants of FIG. 2.
Figure 7:
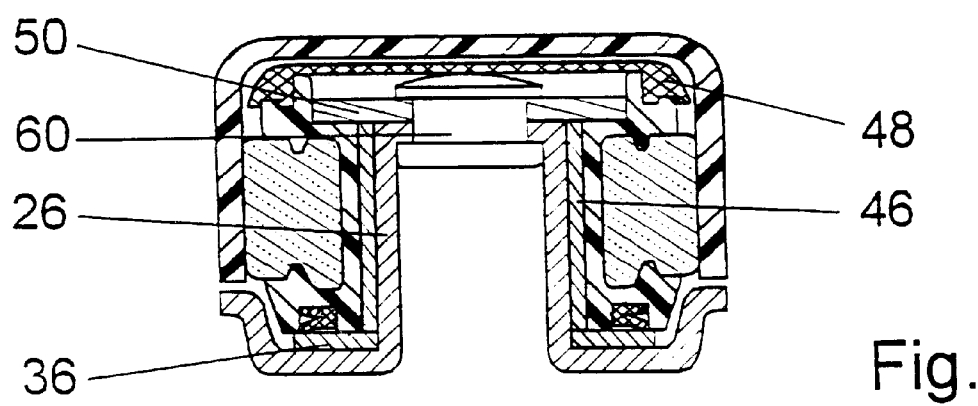

In the constructions according to FIGS. 3, 6 and 7, a bearing bush 46 formed of high-quality bearing material is provided, e.g., a so-called DU bush or plastic bush, which is fastened in the bearing part 16. However, it can also be pressed on the bearing pin 26 (FIG. 7). Because of the greater loading capacity of the bearing bush 46, the bearing surface can be reduced, especially its length, resulting in a flatter link joint construction. The seal between the bearing part 16 and the bearing disk 36 is formed, according to FIG. 3, by a profile ring 44 with a substantially square cross section and, according to FIG. 5, by a lip seal.

Figure 8:
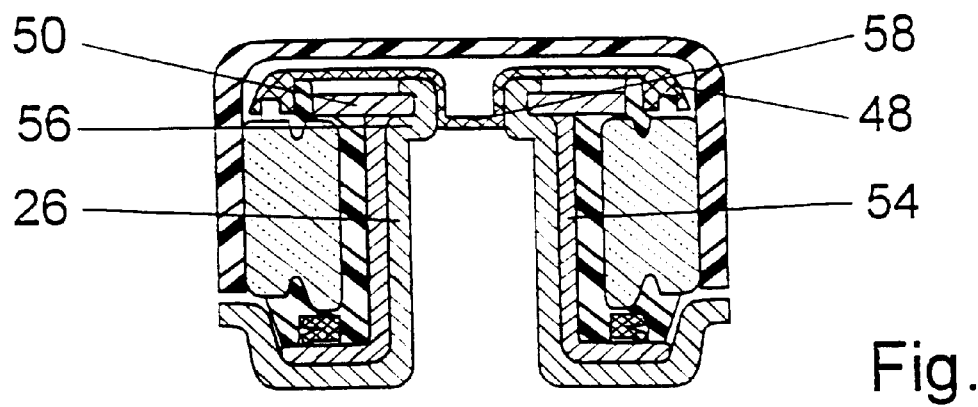
Figure 9:
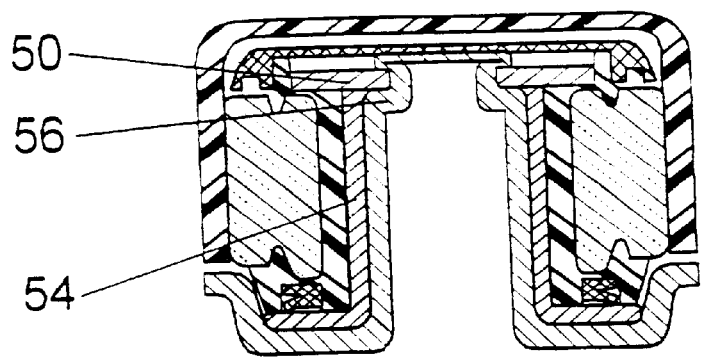

In the constructions according to FIGS. 6 to 9, the stop face or terminating surface 18 is formed by another bearing disk 50. This is held between a spacer sleeve 52 and an outer rivet edge of the hollow body 26 (FIG. 3) or is connected by a separate rivet 60 with the base of the hollow body 26, wherein the hollow body 26 serves as a spacer piece between the bearing disks 36 and 50 (FIG. 6). The spacer sleeve 52 can accordingly be dispensed with. Finally, the bearing disk 50 can contact a collar 56 of the hollow body 26 and can be held by its rivet edge (FIGS. 8 and 9). In the constructions according to FIGS. 7 to 9, the spacer sleeve 52 and bearing bush 46 can be omitted in that a bearing material 54 is applied directly to the hollow body 26, in particular by injection. The bearing material 54 advisably extends into the area of the trough 24, so that the bearing disk 36 can be omitted.

As was already mentioned, the inner front side of the hollow body 26 is advisably closed. However, it can also be constructed so as to be open (FIGS. 6 and 8) when a hat-shaped part 58 of the sealing cap 48 seals the opening.

Figure 10:
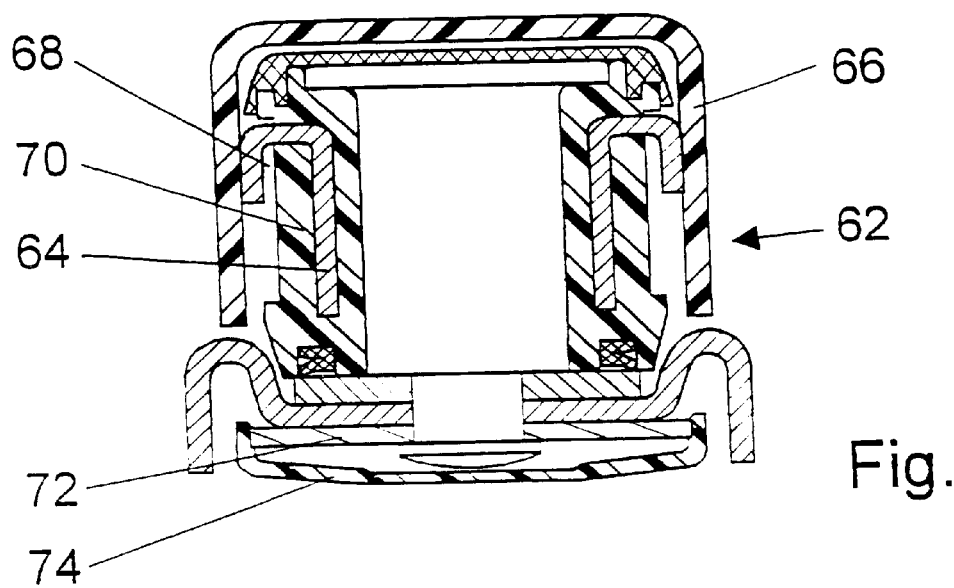
FIG. 10 shows a section through a link joint according to FIG. 1 with a second lever as bent sheet metal part.
Figure 11:
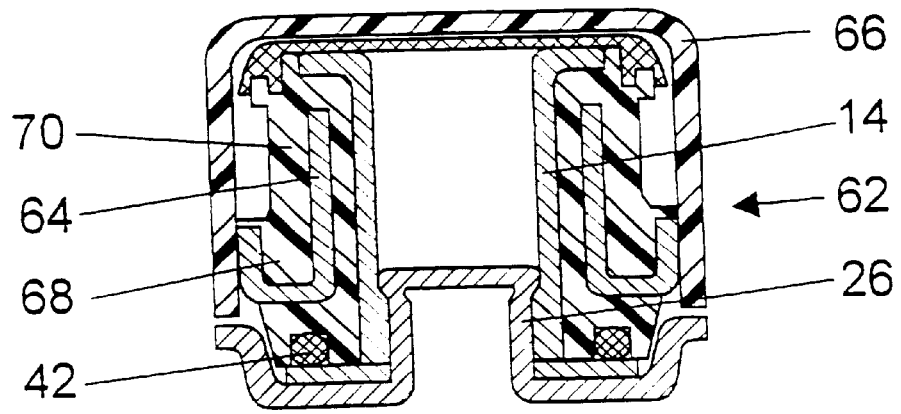
FIG. 11 shows a section through a link joint according to FIG. 2 with a second lever as bent sheet metal part.

The constructions according to FIGS. 10 and 11 have a second lever 62 in the form of a bent sheet metal part which has a U-shaped cross section and whose bearing eyes are formed by everted portions 64. The latter are injection-molded on both sides with bearing material 70. This ensures that the bearing areas retain their shape within permissible tolerances and do not deform during the injection process. For technical process-related reasons, the intermediate space 68 between the everted portion 64 and the U-shaped profile is filled to a greater or lesser extent with bearing material 70.

The second lever 62 is lined on the outside with a plastic covering 66. When the open side of the U-shaped profile faces toward the plastic covering 66, this results in a closed lever 62 which is protected on all sides. The second lever 62 can take the place of the second lever 12 unconditionally, so that one or more advantages can be realized, as desired.

What is claimed is:

1. Link joint with a first lever (10) which is constructed as a bent sheet metal part and which has, at one end, a trough (24) receiving a bearing pin (14) and with a second lever (12) having a bearing eye (15) which encloses the bearing pin (14) and which has a bearing part (16) that is held between two stop surfaces (18, 20) arranged at front sides of the bearing part (16) characterized in that the bearing pin (14) has a hollow space (22) which is open at least toward a front side and that the trough (24) has, in the center, a deep-drawn hollow body (26) which projects into the hollow space (22) of the bearing pin (14) and is riveted at its front side (28) with the bearing pin (14).

2. Link joint according to claim 1 characterized in that the hollow space (22) has a narrowed portion toward the trough (24), which narrowed portion serves as a contact face (30) for the hollow body (26).

3. Link joint according to claim 1, characterized in that a front side edge (32) of the trough (24) closes radially with a joint cover (34).

4. Link joint according to claim 1 characterized in that a bearing disk (36) is arranged in the trough (24), wherein the bearing part (16) contacts the bearing disk (36), while the oppositely located contact face is formed by a collar (38) of the bearing pin (14).

5. Link joint according to claim 4 characterized in that an axial seal in the form of a lip seal (40) or profile ring (42, 44) is provided between the bearing part (16) and the bearing disk (36).

6. Link joint according to claim 1 characterized in that a bearing bush (4) of plastic-coated steel is connected with the bearing part (16) or with the bearing pin (14).

7. Link joint according to claim 1 characterized in that the bearing part (14) has a sealing cap (48) at its front side remote of the trough (24).

8. Link joint according to claim 4 characterized in that the hollow body (26) forms a bearing journal in that it is guided through the bearing part (16) and is riveted at its outer end with a second bearing disk (50) for the bearing part (16).

9. Link joint according to claim 8 characterized in that a spacer sleeve (52 between the two bearing disks (36, 50) serves as a support bearing for the second bearing disk (50).

10. Link joint according to claim 8 characterized in that the hollow body (26) is coated at its outer circumference and the trough (24) is coated on the inside with a bearing material and the hollow body (26) forms a collar (56) at its outer end on which the second bearing disk (50) is supported.

11. Link joint according to claim 1 characterized in that the hollow body (26) is closed at its outer end.

12. Link joint according to claim 1, characterized in that the hollow body (26) has, at its outer end, an opening which is sealed by a central part (58) of a sealing cap (48).

13. Link joint according to claim 8, characterized in that the second bearing disk (50) is guided over the hollow body (26) and is connected with the latter at its front side by a rivet (60).

14. Link joint according to claim 1 characterized in that the second lever (62) is constructed as a bent sheet metal part with a substantially U-shaped profile which has a deep-drawn everted portion (64) in the area of the bearing part (16), wherein the bearing part (16) is injected on the everted portion (64).

15. Link joint according to claim 14 characterized in that the bearing part (16) is arranged on the inside and outside of the everted portion (64).

16. Link joint according to claim 14 characterized in that the U-shaped profile is lined by a plastic covering (66).

17. Link joint according to claim 17 characterized in that the open side of the U-shaped profile faces the covering (66).

18. Link joint according to claim 17 characterized in that the intermediate space (68) between the U-shaped profile and the everted portion (64) is partially or completely filled with bearing material (70).

\* \* \* \* \*